US012730640B2

(12) United States Patent
Perry et al.

(10) Patent No.: US 12,730,640 B2
(45) Date of Patent: Sep. 8, 2026

(54) TECHNIQUES FOR OPTIMIZING STORE OF COMMON VALUES TO MEMORY STRUCTURES

(71) Applicant: Ampere Computing LLC, Santa Clara, CA (US)

(72) Inventors: Jonathan Christopher Perry, Portland, OR (US); David Paul Turley, Portland, OR (US); Benjamin Crawford Chaffin, Portland, OR (US)

( * ) Notice: Subject to any disclaimer, the term of this patent is extended or adjusted under 35 U.S.C. 154(b) by 392 days.

(21) Appl. No.: 18/490,690

(22) Filed: Oct. 19, 2023

(65) Prior Publication Data

US 2025/0130804 A1 Apr. 24, 2025

(51) Int. Cl.
*G06F 9/30* (2018.01)

(52) U.S. Cl.
CPC ................................ *G06F 9/30145* (2013.01)

(58) Field of Classification Search
CPC .................................................. G06F 9/30145
See application file for complete search history.

(56) References Cited

U.S. PATENT DOCUMENTS

| | | | | |
|---|---|---|---|---|
| 10,901,492 | B1 * | 1/2021 | Bshara | G06F 1/329 |
| 2018/0307491 | A1 * | 10/2018 | Carro | G06F 9/30038 |
| 2021/0035258 | A1 * | 2/2021 | Ray | G06F 9/3001 |
| 2022/0244880 | A1 * | 8/2022 | Anderson | G06F 3/0673 |

* cited by examiner

*Primary Examiner* — Zachary K Huson

(74) *Attorney, Agent, or Firm* — Muncy, Geissler, Olds & Lowe, P.C.

(57) ABSTRACT

Disclosed are techniques for optimizing store of common values to memory structures. In an aspect, a method for instruction decoding may include obtaining a store instruction that involves two or more registers. The method may include determining that at least one register of the two or more registers comprises an all-zeros value. The method may also include decoding the store instruction into a store-zeros micro-operation based at least in part on the determining. In some examples of the method, zeros-indicating metadata may be used to indicate that an all-zeros value has been stored in a memory structure.

20 Claims, 6 Drawing Sheets

Figure 2:
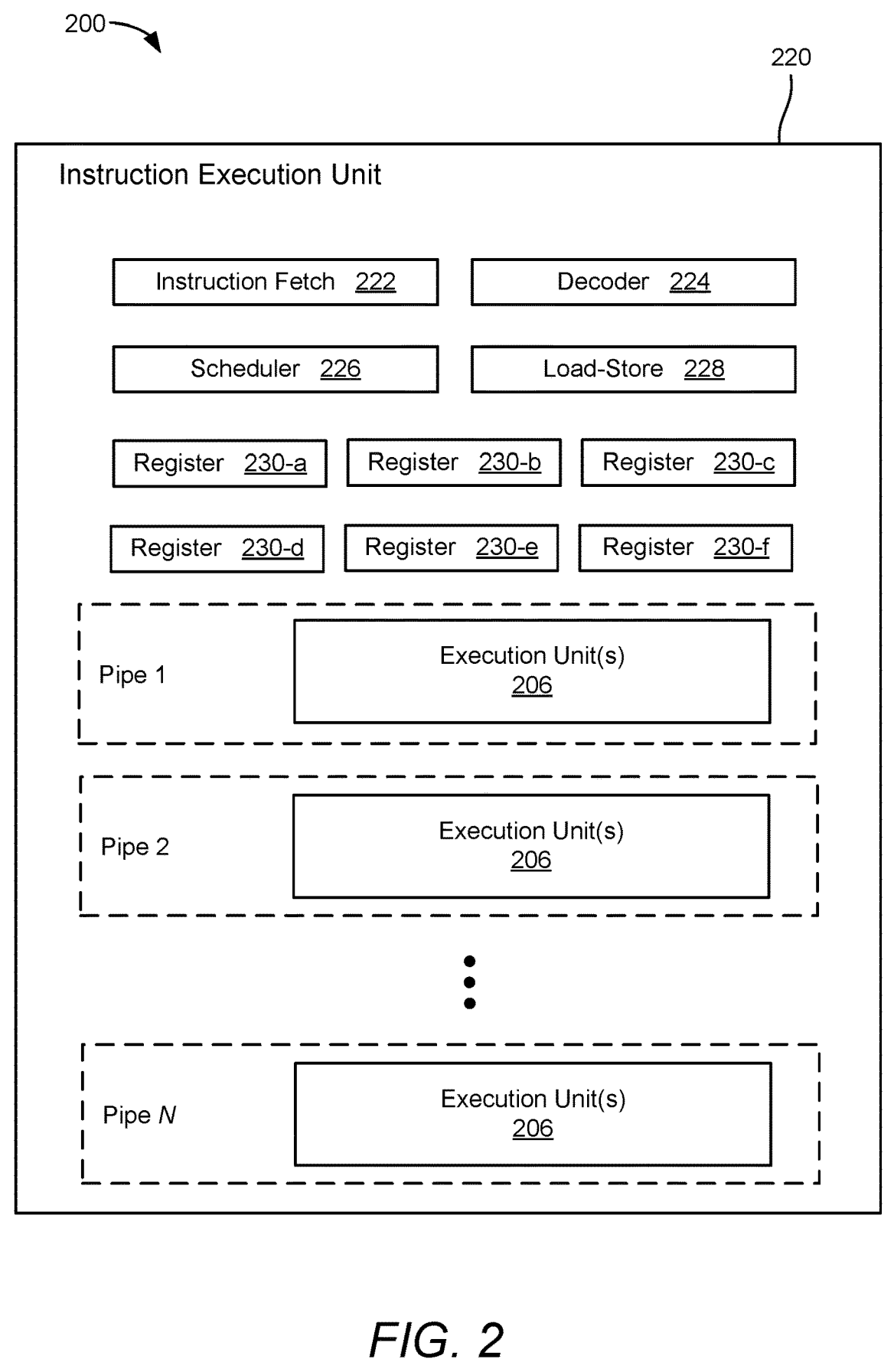

200

220

Instruction Execution Unit

Instruction Fetch 222

Decoder 224

Scheduler 226

Load-Store 228

Register 230-a

Register 230-b

Register 230-c

Register 230-d

Register 230-e

Register 230-f

Pipe 1

Execution Unit(s) 206

Pipe 2

Execution Unit(s) 206

Pipe *N*

Execution Unit(s) 206

```
class STP_64_ldstpair_off(Translation):
    """Store Pair of Registers"""
    """STP <Xt1>, <Xt2>, [<Xn|SP>{, #<imm>}]"""   302
    def decode (self, f):
        #If the second data source is XZR, then do not use the STDHI.
        #Use a separate μop to get zeros implicitly
        if f.Rt2.value == 0b11111:                  304
            stpz_d_64_base(src1=f.Rn, src2=f.Rt)    306
        else:                                       308
            stp_d_64_base(src1=f.Rn, src2=f.Rt)     310
            stdhi_d(src2=f.Rt2)                     312
```

FIG. 3

TECHNIQUES FOR OPTIMIZING STORE OF COMMON VALUES TO MEMORY STRUCTURES

BACKGROUND OF THE DISCLOSURE

1. Field of the Disclosure

Aspects of the disclosure relate generally to processes associated with memory structures.

2. Description of the Related Art

An instruction set architecture (ISA) is part of the abstract model that defines how a processing unit, such as a central processing unit (CPU) executes software. The ISA defines the set of hardware operations that the software may perform, specifying both what the processing unit is capable of doing as well as how it gets done. The ISA includes instructions that are decoded into micro-operations for execution by the CPU. The instructions in the ISA include store instructions that derive the data to be stored from register source(s) to memory. These register sources are typically tracked by schedulers and various functional units of the CPU.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for instruction decoding may include obtaining a store instruction that involves two or more registers. The method may include determining that at least one register of the two or more registers comprises an all-zeros value. Additionally, the method may include decoding the store instruction to include a store-zeros micro-operation based at least in part on the determining.

In an aspect, a processing unit includes a plurality of registers. The processing unit may also include one or more processors communicatively coupled to the plurality of registers and to communicate with one or more memories. The one or more processors, either alone or in combination, may be configured to obtain a store instruction that involves two or more registers. The one or more processors, either alone or in combination, may also be configured to determine that at least one register of the two or more registers comprises an all-zeros value. Additionally, the one or more processors, either alone or in combination, may be configured to decode the store instruction to include a store-zeros micro-operation based at least in part on the determining.

In an aspect a non-transitory computer-readable medium stores computer-executable instructions that, when executed by a processing unit, may cause the processing unit to obtain a store instruction that involves two or more registers. The computer-executable instructions, when executed by the processing unit, may also cause the processing unit to determine that at least one register of the two or more registers comprises an all-zeros value. Additionally, the computer-executable instructions, when executed by the processing unit, may cause the processing unit to decode the store instruction to include a store-zeros micro-operation based at least in part on the determining.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 2 illustrates an example hardware configuration of an instruction execution unit in a processing unit, according to aspects of the disclosure.

FIG. 3 illustrates an example code snippet to decode an instruction into multiple micro-operations, according to aspects of the disclosure.

DETAILED DESCRIPTION

Figure 1:
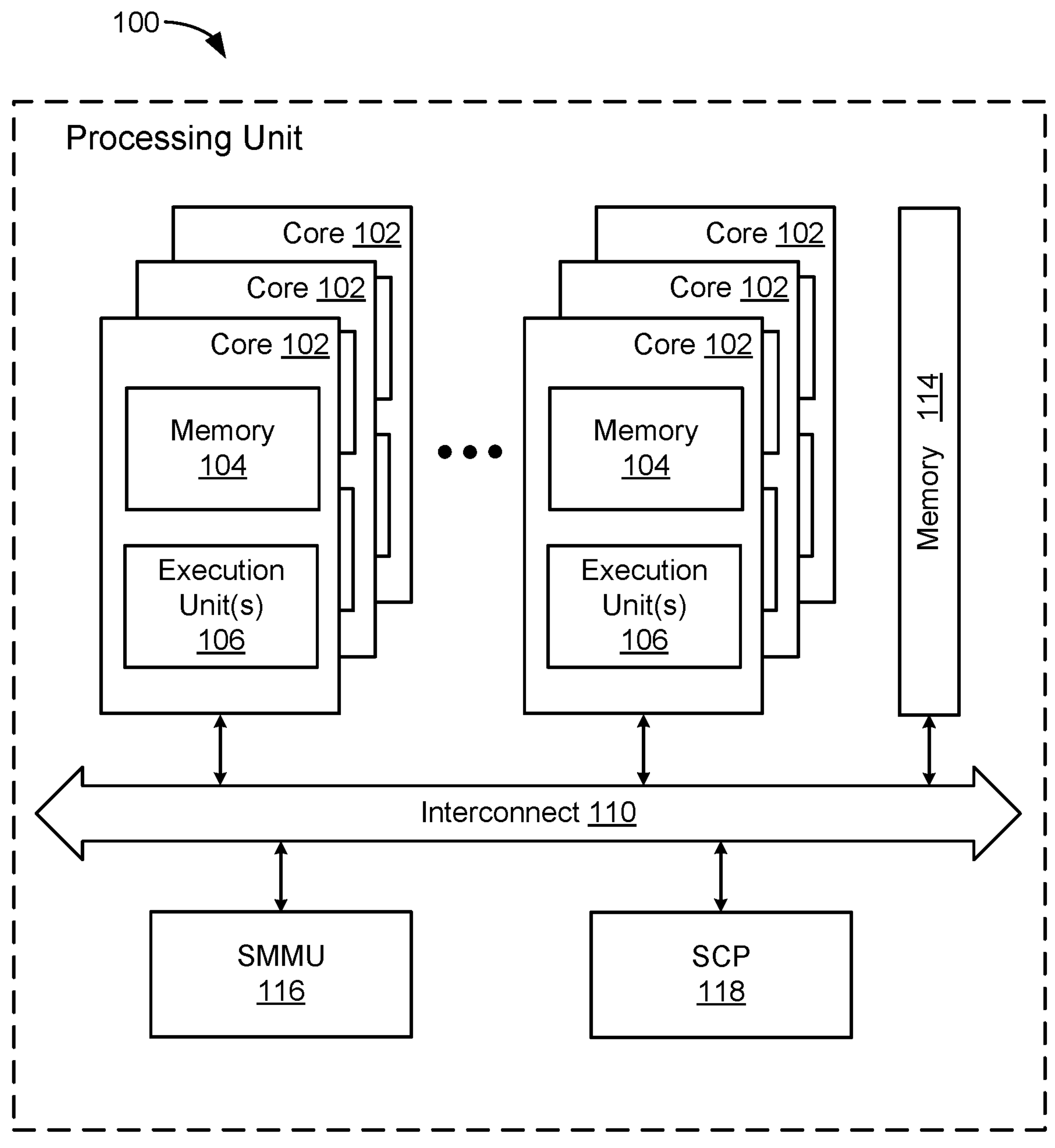
FIG. 1 illustrates an example of a processing unit, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects of the subject technology relate to techniques for optimizing store of common values to memory structures. Generally, a microarchitecture may collect data from memory, load the data from memory into a set of registers, perform operations on the data in the set of registers using one or more pipelined execution units, write the results of the operations back to memory, and store the results into memory. In various microarchitecture designs, writing certain values for the data from registers into memory (e.g., cache memory) may be a common occurrence at various stages of processing instructions. For example, all zeros may be a value that is stored into memory from one or more zero registers. In some cases, an all-zeros value may be a predicted result of operations performed on registers while executing various instructions and corresponding micro-operations. In some cases, an all-zeros value may be written to and/or read from various memory structures associated with the microarchitecture.

The subject technology relates to optimizations using one or both of hardware and software in various microarchitecture designs when certain common values (e.g., all-zeros values) of data are to be written into or read from memory structures during execution of various instructions and corresponding micro-operations. In some examples of the subject technology, these optimizations may be applied to data to be stored from certain registers (e.g., one or more zero registers) into cache memory. In some examples of the subject technology, these optimizations may be applied to data associated access related to memory structures, such as system-level (or last-level) cache memory and/or double data rate synchronous dynamic random-access memory (DDR SDRAM).

It is to be appreciated that in some ISAs, multiple register sources may be required when performing a store instruction. For example, a store pair of registers (STP) instruction may require a register source for an address, another register source for a first data element, and another register source for a second data element. That is, store instructions may involve multiple register sources to be performed. By comparison, load instructions (e.g., a load register (LDR) instruction) may only require a single register source for execution of the corresponding micro-operations. Accordingly, optimizations using one or both of hardware and software may be implemented during execution of certain instructions (e.g., store instructions, memory function instructions, etc.) when the certain common values (e.g., all zeros) are to be written from registers into cache memory.

In some examples, an ISA may provide a mnemonic for identifying a value to be written to a register source. For example, some instructions that are to be decoded into micro-operations may include a zero register (XZR) mnemonic to indicate an all-zeros value is to be stored from register sources into cache memory. Optimizations may be triggered by such mnemonics used in store instructions in accordance with some implementations. Additionally, in some cases, the all-zeros value stored into the cache memory may be used for subsequent instructions and corresponding micro-operations.

Because all-zeros values are common and register sources have to be tracked in scheduler structures and/or communicated across various units of instruction execution units, optimizing store instructions as described herein provides benefits to microarchitecture designs by reducing the number of micro-operation store operations to cache memory that need to be performed. That is, for example, reducing the number of register sources that are to be tracked and/or used for certain instructions may beneficially increase the processing speed and/or decrease the power consumption of a processing unit implementing these optimizations.

In accordance with some aspects, a decoder of an instruction execution unit may generate a store-zeros micro-operation when decoding certain instructions, such as a store instruction. In some cases, the store-zeros micro-operation may correspond to a micro-operation that would otherwise utilize data elements from multiple registers and store those data elements into cache memory. The store-zeros micro-operation may be designed to optimize the storing of all-zeros data by eliminating one or more micro-operations associated with the instruction that would otherwise be needed to complete the store instruction from the multiple registers into the cache memory.

That is, for example, when the decoder receives the store instruction (e.g., an STP instruction) that typically invokes two or more micro-operation in which two or more registers are used and determines an all-zeros value (or other common value) is to be stored in cache memory, the decoder may generate a store-zeros micro-operation (or a store-common-value micro-operation) to be scheduled for execution by a scheduler of the instruction execution unit. When the store-zeros micro-operation is scheduled by the scheduler to be performed, rather than accessing each of the two or more registers to store the all-zeros value into cache memory, the store-zeros micro-operation may implicitly store the all-zeros value into cache memory without accessing at least some of the registers involve in the store instruction.

In this manner, fewer micro-operations are performed by the instruction execution unit of a processing unit thereby reducing the energy cost of certain instructions and increasing performance throughput. That is, for example, fewer micro-operations are needed to complete a store instruction when implementing the store-zeros micro-operation rather than multiple micro-operations that store every value from the multiple registers into cache memory. Accordingly, less energy is expended by the instruction execution unit in performing the fewer number of micro-operations.

Additionally, in some examples, zeros-indicating metadata may be used to indicate that an all-zeros value has been stored in some register sources and/or memory addresses. In this manner, certain writes/stores and/or loads/reads from registers into cache memory or from the cache memory to the registers may be suppressed. Thus, the microarchitecture of the processing unit realizes a power savings by not performing at least some of these store or load functions via memory access. Rather, if the all-zeros value is necessary for subsequent operations, software-generated or decoder-circuitry-generated all-zeros values may be provided by the processing unit, in accordance with some implementations.

It is to be appreciated that a trade-off exists in the microarchitecture of the processing unit in that some complexity may be introduced to the instruction decoding circuitry to implement the store-zeros micro-operation and/or the zeros-indicating metadata. For example, additional instruction decoding logic may be required to determine in which cases the store-zeros micro-operation should be applied in the instruction decoding process of the instruction execution unit.

In some examples, the knowledge of the all-zeros value may be known to the decoder of the instruction execution unit based on the mnemonic associated with the instruction being decoded. For example, an instruction may include a mnemonic indicating the all-zeros value in a zero register (e.g., an XZR mnemonic). This mnemonic may indicate to the decoder that the all-zeros value of the zero register is to be used, for example, as a data element associated with the instruction. In some cases, the decoder of the instruction execution unit may generate the store-zeros micro-operation based on the mnemonic indicating the all-zeros value. In some cases, use of the zeros-indicating metadata may be further triggered by the knowledge of the all-zeros value being stored into cache memory.

Additionally, or alternatively, the processing unit may dynamically determine or predict that the all-zeros value associated with a micro-operation store operation is to be stored into cache memory. In some cases, the micro-operation store operation may be associated with a set of micro-operations corresponding to an instruction or set of instructions in which the all-zeros value is predicted as a result.

That is, for example, calculating an all-zeros value (or other common value) dynamically at the decode stage may include a speculative prediction which may later include a verification of the prediction. Because the decode stage can be early in the pipeline, the dynamic register values for which the all-zeros value may be applied are generally not yet available. Accordingly, a prediction indicator for a data element predicted to an all-zeros value (e.g., predict zero register (PZR) or the like) may operate in a similar manner as the zero mnemonic to trigger the use of the store-zeros micro-operation.

In some examples, zeros-indicating metadata (or common-value-indicating metadate), such as one or more indicator bits (e.g., to indicate an all-zeros value in a memory address) may be set with respect to a store queue or like register structure for intermediate buffering and forwarding of data. The number of bits in the one or more indicator bits is fewer than the number of bits in a data element stored in the store queue. That is, for example, when a data element is to be retrieved from the store queue during execution of multiple micro-operations associated with an instruction or set of instructions. The zeros-indicating metadata may be set to indicate that the store queue has the all-zeros data stored therein. Accordingly, one or more components (e.g., a scheduler, a load-store unit and/or execution units) of the instruction execution unit may check the one or more indicator bits prior to accessing the store queue to retrieve the data element therein.

In this manner, for example, after the store-zeros micro-operation has been executed and/or an all-zeros value is stored to a memory address, such as an memory address corresponding to cache memory location or a store queue register, the one or more components (e.g., the scheduler, the load-store unit and/or the execution units) of the instruction execution unit may be made aware via the zeros-indicating metadata the all-zeros value is currently stored in the cache memory location or the store queue register. As such, the one or more components of the instruction execution unit may subsequently apply the all-zeros value when performing other micro-operations rather than performing memory access functions to do so.

FIG. 1 illustrates an example of a processing unit 100, according to aspects of the disclosure. In some examples, the techniques for optimizing store of common values to memory structures described herein may be implemented using processing unit 100. Processing unit 100 is configured as a central processing unit (CPU) but may also be used with or configured as other processing units, such as but not limited to a graphics processing (GPU) or tensor processing unit (TPU). Processing unit 100 may include a set of processing cores 102 (or simply "cores" 102). Each core 102 may include cache memory 104 and one or more execution units 106. Each core 102 may be coupled to interconnect 110. In some examples, cache memory 104 may be configured as data cache memory and instruction cache memory on the core 102 (e.g., 64 KB L1 Instruction-cache, 64 KB L1 Data-cache, and 1 MB L2 cache, in one aspect).

The one or more execution units 106 may perform various operations and calculations associated with instructions and micro-operations of the core 102. The one or more execution units 106 may be configured as various units in the core 102 in accordance with various implementations. For example, the one or more execution units 106 may include arithmetic logic units (ALUs) that perform arithmetic and logic operations for the core 102. The one or more execution units 106 may include floating point units (FPUs) that perform floating point calculations. The one or more execution units 106 may include integer execution units (IXUs) for performing integer operations. The one or more execution units 106 may also include single instruction, multiple data (SIMD) execution units for performing various instructions. In some examples, an execution unit 106 may perform a combination of these and other operations. Each of the one or more execution units 106 may include a bus or interconnect, for example, to connect hardware elements of the execution units 106 to cache memory 104 to perform read and write functions while executing micro-operations. Additionally, or alternatively, one or more execution units 106 including ALUs, FPUs, IXUs, and/or SIMD execution units may be configured for all or a subset of the cores 102.

Processing unit 100 may also include system-level (or last-level) cache memory 114, which may be coupled to interconnect 110. In some examples, system-level cache memory 114 may include system-level cache (e.g., 32 MB in one aspect) that may be used for various purposes by the processing unit 100. Processing unit 100 may also include a system memory management unit (SMMU) 116, The SMMU 116 may provide translation services, for example, to non-processor master units. That is, for example, the SMMU 116 may translate addresses for direct memory address (DMA) requests from system I/O devices before the requests are passed to interconnect 110. Processing unit 100 may also include a system control processor (SCP) 118. The SCP 118 may be configured to handle various system management functions. In some examples, the SCP 118 may include separate microcontrollers (or processors). In some examples, the SCP 118 may be combined into one or two microcontrollers, or sub-divided into more than two microcontrollers in accordance with various implementations to handle various system management functions.

Interconnect 110 may be configured as a mesh interconnect that forms a high-speed interface that couples each of core 102 to the other cores 102 and other components in processing unit 100.

It is to be appreciated that the processing unit 100 of FIG. 1 may be configured according to a monolithic die design or a disaggregated chiplet design. That is, for example, in the monolithic die design, the cores 102, interconnect 110, system-level cache memory 114, SMMU 116, and SCP 118 may be configured on a single die. In some cases, for example, in the disaggregated chiplet design, each chiplet of multiple disaggregated chiplets may include a subset of the cores 102 (e.g., in a tiled fashion) with a memory controller to control a portion of system-level cache memory 114, and a peripheral component interconnect (PCI) or PCI express (PCIe) controller to control the interface with interconnect 110, SMMU 116, and/or SCP 118. Additionally, or alternatively, other computer architecture designs may be used in various implementations give the benefit of the disclosure.

FIG. 2 illustrates an example hardware configuration 200 of an instruction execution unit 220 in a processing unit, according to aspects of the disclosure. In some examples, the techniques for optimizing store of common values to memory structures described herein may be implemented using hardware configuration 200. The instruction execution unit 220 in hardware configuration 200 may be implemented in various processing units. For example, the instruction execution unit 220 in hardware configuration 200 may be implemented in at least some of the one or more cores 102 described with respect to processing unit 100 in FIG. 1.

As illustrated in FIG. 2, an instruction execution unit 220 may include one or more pipelines. For example, the instruction execution unit 220 may include a first pipeline (e.g., Pipe 1), a second pipeline (e.g., Pipe 2), and additional pipelines up to an N-th pipeline (e.g., Pipe N). Each pipeline may include one or more execution units 206. In some examples, the instruction execution unit 220 may include various components and memory structures. For example, the instruction execution unit 220 may include an instruction fetch unit 222, a decoder 224, a scheduler 226, and a load-store unit 228.

The instruction fetch unit 222 may fetch instructions from cache memory (e.g., instruction cache of cache memory 104) and pass the fetched instructions to the decoder 224. The decoder 224 may be an instruction decode and rename (IDR) unit that receives instructions, interprets the instructions, decodes each instruction into micro-operation(s), and forwards the micro-operation(s) to the scheduler 226. In some examples, the decoder 224 may parse the instructions into one or more opcodes and corresponding data/control information that may be used by the scheduler and/or other components of the instruction execution unit 220. The scheduler 226 may queue multiple micro-operations and send each of the micro-operations to the load-store unit 228 and/or the one or more execution units 206. In some cases, the scheduler 226 may manage and schedule some micro-operations for execution by the first pipeline (e.g., Pipe 1) and some micro-operations for execution by the second pipeline (e.g., Pipe 2).

In some examples, the instruction execution unit 220 may include or have access to a plurality of registers 230. These registers 230 may include general-purpose registers, zero registers, status registers, etc. In some examples, the registers 230 may hold a small amount of data (e.g., 32-bits, 64 bits, 128 bits, etc. in one aspect) relative to the total cache memory in a processing unit. For example, a core (e.g., core 102) on which the instruction execution unit 220 may operate can include cache memory (e.g., a 64 KB L1 Data-cache and 1 MB L2 cache in one aspect) that may be used by the core. The registers 230 associated with instruction execution unit 220 may be loaded with and store storage addresses, control information, data, etc. In some examples, the physical structure of these registers 230 may be formed from a portion of cache memory (e.g., cache memory 104) available for use by a core (e.g., core 102). For example, data processing operations associated with various micro-operations may operate on at least some of these registers 230.

In some examples, the instruction execution unit 220 may include limitations as to the type and information that may be loaded from cache memory (e.g., cache memory 104 or system-level cache memory 114) into register 230-*a*, register 230-*b*, register 230-*c*, register 230-*d*, register 230-*e*, and/or register 230-*f*. Additionally, or alternatively, the instruction execution unit 220 may include limitations as to the type and information that may be stored from register 230-*a*, register 230-*b*, register 230-*c*, register 230-*d*, register 230-*e*, and/or register 230-*f* into cache memory. It is to be understood that more or fewer registers 230 may be configured in accordance with various implementations.

FIG. 3 illustrates an example code snippet 300 to decode an instruction into multiple micro-operations, according to aspects of the disclosure. In this non-limiting example, code snippet is written using the Python programming language but other programming languages and/or coding techniques may be used the decode the instruction into multiple micro-operations as would be apparent given the benefit of the disclosure.

In some examples, code snippet 300 may be implemented in software to optimize an instruction execution unit (e.g., instruction execution unit 220) of a core (e.g., core 102) of a processing unit (e.g., processing unit 100). In some implementations, the instruction execution unit may include hardware (e.g., additional decoder circuitry) corresponding to the code snippet 300. That is, for example, code snippet 300 represents a description of how a decoder may break down an ISA instruction into one or more micro-operations to satisfy an instruction semantics. The code snippet 300 provides an example of how to incorporate a store-zeros micro-operation to satisfy the instruction semantics for a store instruction with all-zeros data, in accordance with some implementations. It is to be appreciated that the store-zeros micro-operation may beneficially reduce the energy cost of a store instruction with all-zeros data as compared to other micro-operations that may be used to satisfy the instruction semantics.

In the example of FIG. 3, code snippet 300 operationally decodes a store instruction to include fewer micro-operations by refraining from using at least one register (e.g., a zero register) in the store instruction that corresponds to an all-zeros value when storing the all-zeros value into cache memory. That is, for example, if at least one data source in the STP instruction is detected to be an all-zeros value (e.g., code line 304), the STP instruction is decoded into a store-zeros micro-operation (e.g., stpz_d_64_base (src1=f.Rn, src2=f.Rt) at code line 306). In some examples, the store-zeros micro-operation represents a single micro-operation to complete the STP instruction in these instances when an all-zeros value is determined.

Else, if none of the data sources in the STP instruction includes an all-zeros value (e.g., code line 308), then the STP instruction is decoded into two store micro-operations: a first store micro-operation (e.g., stp_d_64_base(src1=f.Rn, src2=f.Rt) at code line 310) and a second store micro-operation (e.g., stdhi_d(src2=f.Rt2) at code line 312). The first store micro-operation represents a first micro-operation, and the second store micro-operation represents a second micro-operation to complete the STP instruction in these instances when an all-zeros value is not determined.

In code snippet 300, <Xt1> is the 64-bit name of the first general-purpose register to be encoded in the "Rt" field, <Xt2> is the 64-bit name of the second general-purpose register to be encoded in the "Rt2" field, and <Xn|SP> refers to the 64-bit name of the general-purpose base register or stack pointer, encoded in the "Rn" field (e.g., code line 302). Additionally, the value 0b11111 is used to indicate the zero register (at code line 306). The value 0b11111 as XZR is part of an example ISA instructions set. The instruction semantics of the ISA may indicate that this value 0b11111 always takes the value of zero. In some cases, this value 0b11111 indicates that the argument takes the value zero but does not indicate that that the zero register is to be implemented as a physical register. It is to be understood that instruction semantics that reference other explicit registers that behave like a constant zero or all-zeros value may also invoke a store-zeros micro-operation, in accordance with some implementations.

In some implementations, a microarchitecture constraint may include allowing the instruction execution unit to access no more than two source registers for a single micro-operation. That is, for example, the instruction execution unit may only be permitted to access a single register for an operand (e.g., a source data element) when executing a memory-based micro-operation in accordance with some implementations. That is, for example, the instruction execution unit may be permitted to access two source registers for two operands per micro-operation. However, when the micro-operation corresponds to a memory function, a first source register may be used to indicate a memory address leaving only the second source register to be used as an operand related to the data element of the micro-operation to be stored to the memory address. As illustrated in the example of FIG. 3, each of the store micro-operation (e.g., stp_d_64_base(src1=f.Rn, src2=f.Rt) at code line 310) and the second store micro-operation (e.g., stdhi_d(src2=f.Rt2) at code line 312) use no more than two register sources (e.g., src1 and src2). In some cases, the two operands may correspond to an integer-based micro-operation or a memory-based micro-operation.

It is to be appreciated that other coding examples for decoding store instructions and generating store-zeros micro-operations are contemplated. For example, a first alternative example coding may include an STP instruction as "STP <Wt1>, <Wt2>, [<Xn|SP> {, #<imm>}]", where <Wt1> is the 32-bit name of the first general-purpose register to be encoded in the "Rt" field and <Wt2> is the 32-bit name of the second general-purpose register to be encoded in the "Rt2" field. Additionally, or alternatively, a second alternative example coding may include an STP instruction in which the "if f.Rt2.value" equals a value different from 0b11111, where the f.Rt2.value corresponds to a register address different from a zero register. That is, for example, a register with a register address corresponding to the f.Rt2.value may be configured to include contents of a data element different from an all-zeros value. Additionally, or alternatively, a third alternative example coding may include an STP instruction in which the "if f.Rt2.value" equals a value corresponding to a prediction that the f.Rt2.value contains an all-zeros value, which may subsequently be verified via other computations involving other micro-operations.

With reference to FIGS. 2 and 3, non-limiting example instruction decoding procedures associated with a store instruction are described. For example, the instruction fetch unit 222 of instruction execution unit 220 may obtain a first STP instruction and provide the first STP instruction to the decoder 224. The first STP instruction may be represented in the form of the following instruction mnemonic: STP <Xt1>, XZR, [<Xn|SP>{, #<imm>}] (e.g., code line 302 with XZR as the <Xt2> operand). Typically, an STP instruction would calculate a memory address from the base register value and immediate offset and store two 64-bit doublewords to the calculated memory address from two registers. That is, for example, the <Xt1> operand may correspond to register 230-*a*, which may be configured as a first general-purpose register, and the XZR operand may correspond to register 230-*f*, which may be configured as a zero register, in some examples. In some examples, for the first STP instruction above, the <Xt1> operand may be ignored during the decoding process, because the XZR operand corresponding to a zero register or an all-zero value informs the decoder 224 that the pair of registers to be stored is an all-zeros value.

That is, for example, the decoder 224 knows an all-zeros value represents the contents of the register corresponding to the <Xt2> operand based on the XZR mnemonic used as the <Xt2> operand in the STP instruction being decoded. That is, rather than the <Xt2> operand indicating a 64-bit name of an address encoded in the "Rt2" field for a second general purpose register, the XZR indicates that a zero register is used as the second register of the two registers being used in the first STP instruction. That is, for example, knowledge of the all-zeros value may be known to the decoder 224 of the instruction execution unit 220 based on this XZR mnemonic being used in an operand of the first STP instruction.

In accordance with the instruction to micro-operation decoding in the code snippet 300, the decoder 224 determines to decode the first STP instruction as the stpz_d_64_base(src1=f.Rn, src2=f.Rt) micro-operation (e.g., code line 306) based on the zero register 230-*f* being used. In this example of a store-zeros micro-operation, the stpz_d_64_base(src1=f.Rn, src2=f.Rt) micro-operation operates to store the all-zeros value into cache memory. In some examples, the size of the all-zeros value corresponds to the combined size of both the src1 register and the src2 register. The decoder 224 may forward the stpz_d_64_base (src1=f.Rn, src2=f.Rt) micro-operation to the scheduler 226, which may schedule the stpz_d_64_base(src1=f.Rn, src2=f.Rt) micro-operation for execution by the load-store unit 228 to access cache memory and store the all-zeros value into a memory address for the cache memory.

Additionally, or alternatively, the instruction execution unit 220 may dynamically determine that an all-zeros value is predicted to be in register 230-*a* and register 230-*b*. That is, for example, register 230-*b* may be configured as a second general-purpose register. Accordingly, rather than using the XZR mnemonic, the decoder 224 or another component of the instruction execution unit 220 may use the predicted determination of the all-zeros value being in the first general-purpose register 230-*a* and the second general-purpose register 230-*b* to generate the stpz_d_64_base (src1=f.Rn, src2=f.Rt) micro-operation or like store-zeros micro-operation. In some cases, a different mnemonic may be used as a prediction indicator. In some cases, the XZR mnemonic may be used in only one (e.g., the second source register, src2) with the other source register (e.g., the first source register, scr1) containing contents that may or may not be all-zeros.

In some examples, the memory address may be calculated from the first STP instruction based on the "Rn" field. The load-store unit 228 may use the calculated memory address to store the 64-bit doubleword contents from the first general-purpose register 230-*a*, which is determined based on the "Rt" field into a memory location corresponding to the calculated memory address. In some examples, the address of memory into which the first general-purpose register 230-*a* is stored may be calculated using register 230-*c*, which may be configured as a third general-purpose register. That is, a memory write operation may involve both the calculation of the memory address and the transfer of data from one or more registers into cache memory identified by the memory address. In some examples, the load-store unit 228 stores the all-zeros value (e.g., a 64-bit doubleword of all zeros) into the cache memory corresponding to the calculated address based on the presence of the XZR mnemonic. That is, for example, the stpz_d_64_base(src1=f.Rn, src2=f.Rt) micro-operation (e.g., code line 306) completes the first STP instruction with this single store micro-operation.

Additionally, a portion of the mnemonic (e.g., "stpz") for this micro-operation may indicate that an all-zeros value was written and stored into cache memory, and zeros-indicating metadata may be set accordingly. That is, for example, after completion of the single store-zeros micro-operation, the results may be stored into system-level cache memory (e.g., system-level cache memory 114 in FIG. 1) and subsequently stored into memory (e.g., DDR SDRAM) external to the processing unit. However, the zeros-indicating metadata may be used to refrain from the need to subsequently access the all-zeros value stored in the system-level cache memory and/or the memory external to the processing unit.

With further reference to FIGS. 2 and 3, the instruction fetch unit 222 of instruction execution unit 220 may obtain a second STP instruction and provide the second STP instruction to the decoder 224. The second STP instruction may be represented in the form of the following instruction mnemonic: STP<Xt1>, <Xt2>, [<Xn|SP>{, #<imm>}] (e.g., code line 302). That is, the second STP instruction may calculate a memory address from the base register value and immediate offset, and may store two 64-bit doublewords to the calculated memory address from two registers, the first general-purpose register 230-*a* and the second general-purpose register 230-*b*. That is, for example, in accordance with the second STP instruction above, the <Xt1> operand may correspond to the first general-purpose register 230-*a* and the <Xt2> operand may correspond to the second general-purpose register 230-*b*.

The decoder 224 knows that the 64-bit name of the second general-purpose register 230-*b* is encoded in the "Rt2" field. That is, for example, there is no indication from the instruction mnemonics that an all-zeros value is contained in the contents of any register for the second STP instruction. In other words, the decoder 224 determines that the f.Rt2.value does not equal 0b11111 (e.g., code line 308). Then, in accordance with code snippet 300, the decoder 224 determines to decode the second STP instructions as the stp_d_64_base(src1=f.Rn, src2=f.Rt) micro-operation (e.g., code line 310) and the stdhi_d (src2=f.Rt2) micro-operation (e.g., code line 312). Thus, two micro-operations are forwarded to the scheduler 226, each of which may be sequentially executed by the load-store unit 228 to access memory and store the values corresponding to the <Xt1> operand and the <Xt2> operand into cache memory corresponding to the calculated memory address from the base register value and immediate offset.

Figure 4:
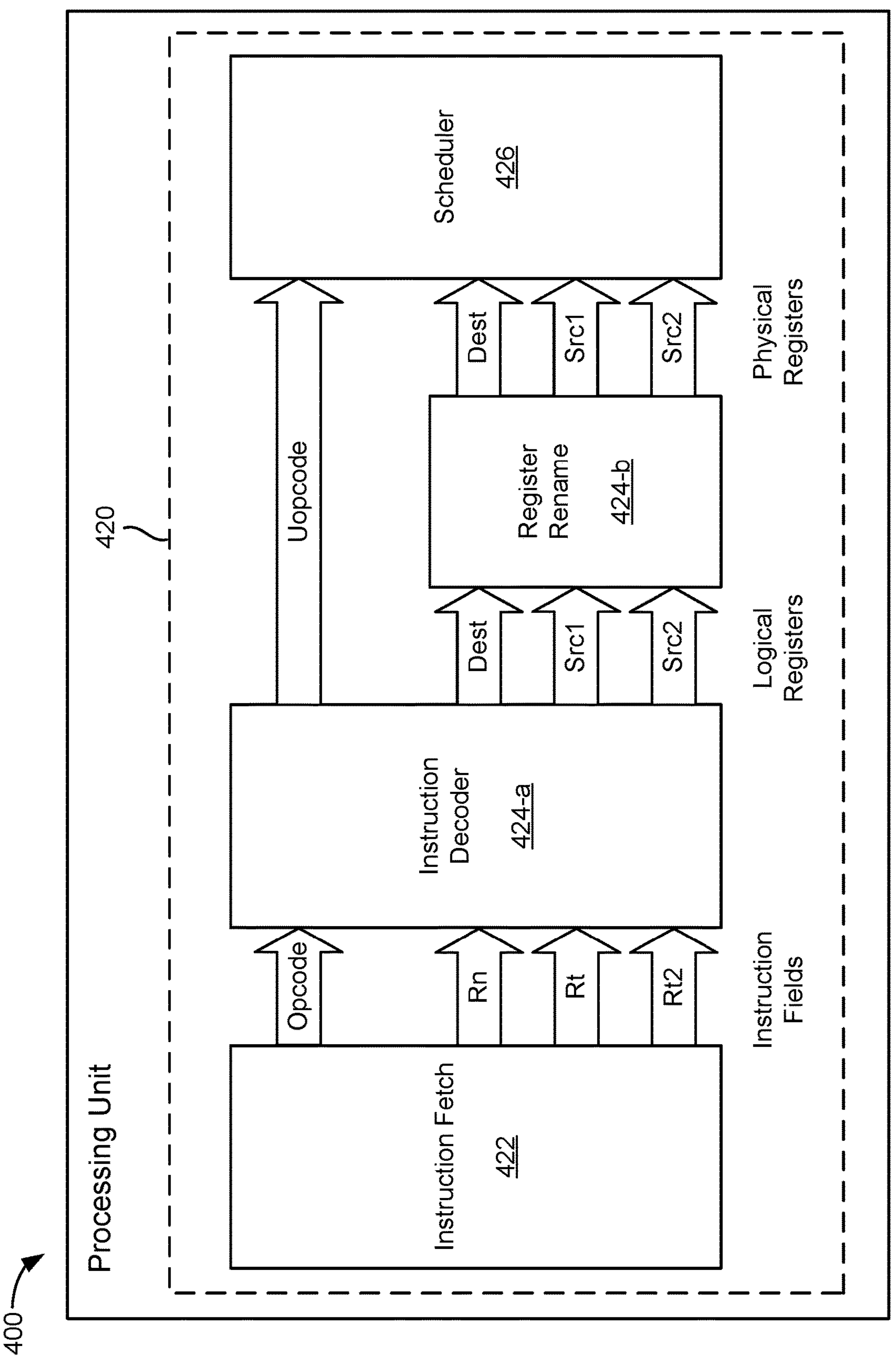
FIG. 4 illustrates an example of a processing unit with an instruction execution unit, according to aspects of the disclosure.

FIG. 4 illustrates an example of a processing unit 400 with an instruction execution unit 420, according to aspects of the disclosure. In some examples, the techniques for optimizing store of common values to memory structures described herein may be implemented using the processing unit 400 with the instruction execution unit 420. Various aspects associated with processing unit 100 may be included in processing unit 400. Similar to processing unit 100, processing unit 400 may be configured as a CPU, a GPU, a TPU, or other processing units. Additionally, various aspects associated with instruction execution unit 220 may be included instruction execution unit 420. In some examples, processing unit 400 may include one or more cores similar to the one or more cores 102 described with respect to processing unit 100 in FIG. 1. In some examples, the instruction execution unit 420 may be implemented in at least some of the one or more cores of processing unit 400.

In some examples, the instruction execution unit 420 may include an instruction fetch unit 422. The decoder circuitry of the instruction execution unit 420 may include an instruction decoder 424-*a* and a register rename unit 424-*b*. The instruction fetch unit 422 may be operatively coupled to the instruction decoder 424-*a*, which may decode instructions received from the instruction fetch unit 422. The instruction execution unit 420 may also include a scheduler 426. The register rename unit 424-*b* may be operatively coupled to the scheduler 426.

With reference to FIG. 3, code snippet 300 may be implemented in software to optimize the instruction execution unit 220 of a core of processing unit 400. In some implementations, the instruction execution unit 420 may include additional decoder circuitry in the instruction decoder 424-*a* and/or the register rename unit 424-*b* corresponding to the code snippet 300. That is, for example, code snippet 300 represents a description of how the instruction decoder 424-*a* and/or the register rename unit 424-*b* may break down an ISA instruction into one or more micro-operations to satisfy an instruction semantics. The code snippet 300 provides an example of how to incorporate a store-zeros micro-operation to satisfy the instruction semantics for a store instruction with all-zeros data, in accordance with some implementations. It is to be appreciated that the store-zeros micro-operation may beneficially reduce the energy cost of a store instruction with all-zeros data as compared to other micro-operations that may be used to satisfy the instruction semantics.

With reference to FIGS. 3 and 4, non-limiting example instruction decoding procedures associated with a store instruction are described. In some examples, the instruction fetch unit 422 may obtain a store instruction that involves two or more registers. That is, for example, the instruction fetch unit 422 may obtain an STP instruction, which may be represented in the form of the following instruction mnemonic: STP XZR, XZR, [<Xn|SP>{, #<imm>}] (e.g., code line 302 with XZR as the <Xt1> operand and the <Xt2> operand). The instruction fetch unit 422 may pass the instruction fields associated with the STP instructions to the instruction decoder 424-*a*. That is, for example, the STP instruction may include an Opcode of "10" to indicate a 64-bit variant of the instruction: an Rn field that encodes the 64-bit name of a general-purpose base register or stack pointer: an Rt field that encodes the 64-bit name of the zero register, and an Rt2 field that also encodes the 64-bit name of the zero register.

In some examples, the instruction decoder 424-*a* may determine that one of the registers (e.g., Rt or Rt2) in the STP instruction has an all-zeros value. That is, for example, instruction decoder 424-*a* may determine that the Rt2 field references that zero register representing an all-zeros value. In some cases, because the Rt2 field represents an all-zeros value, the instruction decoder 424-*a* may trigger decoding of the STP instruction to use the store-zeros micro-operation (e.g., stpz_d_64_base(src1=f.Rn, src2=f.Rt) at code line 306). This store-zeros micro-operation may be a single memory-based micro-operation that is decoded for the STP instruction. That is, for example, the instruction decoder 424-*a* may pass a Uopcode (e.g., micro-operation code) corresponding to the store-zeros micro-operation directly to the scheduler 426.

The instruction decoder 424-*a* may also pass the Rn field as Scr1 (e.g., logical source register 1 for the micro-operation) and the Rt field as Scr2 (e.g., logical source register 2 for the micro-operation) to the register rename unit 424-*b*. In some cases, because the store-zeros micro-operation is a memory-based micro-operation, the instruction decoder 424-*a* may not indicate a destination (Dest) logical register to the register rename unit 424-*b*. The register rename unit 424-*b* may include information, such as the <imm> offset value (e.g., the signed immediate byte offset) to obtain a physical source register corresponding to the general-purpose base register or stack pointer in the Rn field. The register rename unit 424-*b* may also determine a physical source register for the XZR mnemonic in the Rt field, which behaves like constant zero.

In some examples, the register rename unit 424-*b* may pass that also pass the f.Rn value as Scr1 (e.g., physical source register 1 for the micro-operation) and the f.Rt value as Scr2 (e.g., logical source register 2 for the micro-operation) to the scheduler 426. The scheduler 426 may schedule the store-zeros micro-operation, for example, based on the Uopcode, to a load-store unit for execution. The load-store unit may know that an all-zeroes value is to be stored in the memory address calculated from the base register value (e.g., <Xn|SP> encoded in the "Rn" field) and the immediate offset value. The load-store unit may store an all-zeros value in a cache memory (e.g., data cache memory or system-level cache memory) corresponding to the calculated memory address Thus, although the store-zeros micro-operation only includes one 64-bit register (e.g., <Xt1> encoded in the "Rt" field) of the two 64-bit register (e.g., <Xt1> encoded in the "Rt" field, and <Xt2> encoded in the "Rt2" field) corresponding an STP instruction, the store-zeros micro-operation may be operable to include 128-bits of all-zero data into the calculated memory address.

That is, for example, while the STP instruction may involve three registers (e.g., <Xn|SP> encoded in the "Rn" field, <Xt1> encoded in the "Rt" field, and <Xt2> encoded in the "Rt2" field), the store-zeros micro-operation may involve and be required to utilize and track only two registers (e.g., <Xn|SP> encoded in the "Rn" field as Src1 and <Xt1> encoded in the "Rt" field as Src2). That is, for example, the store-zeros micro-operation may implicitly invoke an all-zeros value to be stored into memory without involving or including the third register noted in the STP instruction. In this manner, only one memory-based micro-operation is needed, rather than two memory-based micro-operations as would be required for the STP instruction if the pair of registers being stored did not correspond to an all-zeros value.

It is to be understood that other implementations may include a store instruction different from the STP instruction that involves a larger number of registers that a corresponding store-zeros micro-operation that may be used when the store instruction involves an all-zeros value. Additionally, or alternatively, other instructions corresponding to memory functions, such as loading instructions or the like may utilize a store-zeros micro-operation in accordance with some aspects. It is also to be understood that mnemonic for all-zeros different from XZR may be used depending on the ISA used in a corresponding implementation. Additionally, or alternatively, other common values different from all-zeros may be used in a store-common-value micro-operation for store instructions, as would be understood given the benefit of the disclosure.

Figure 5:
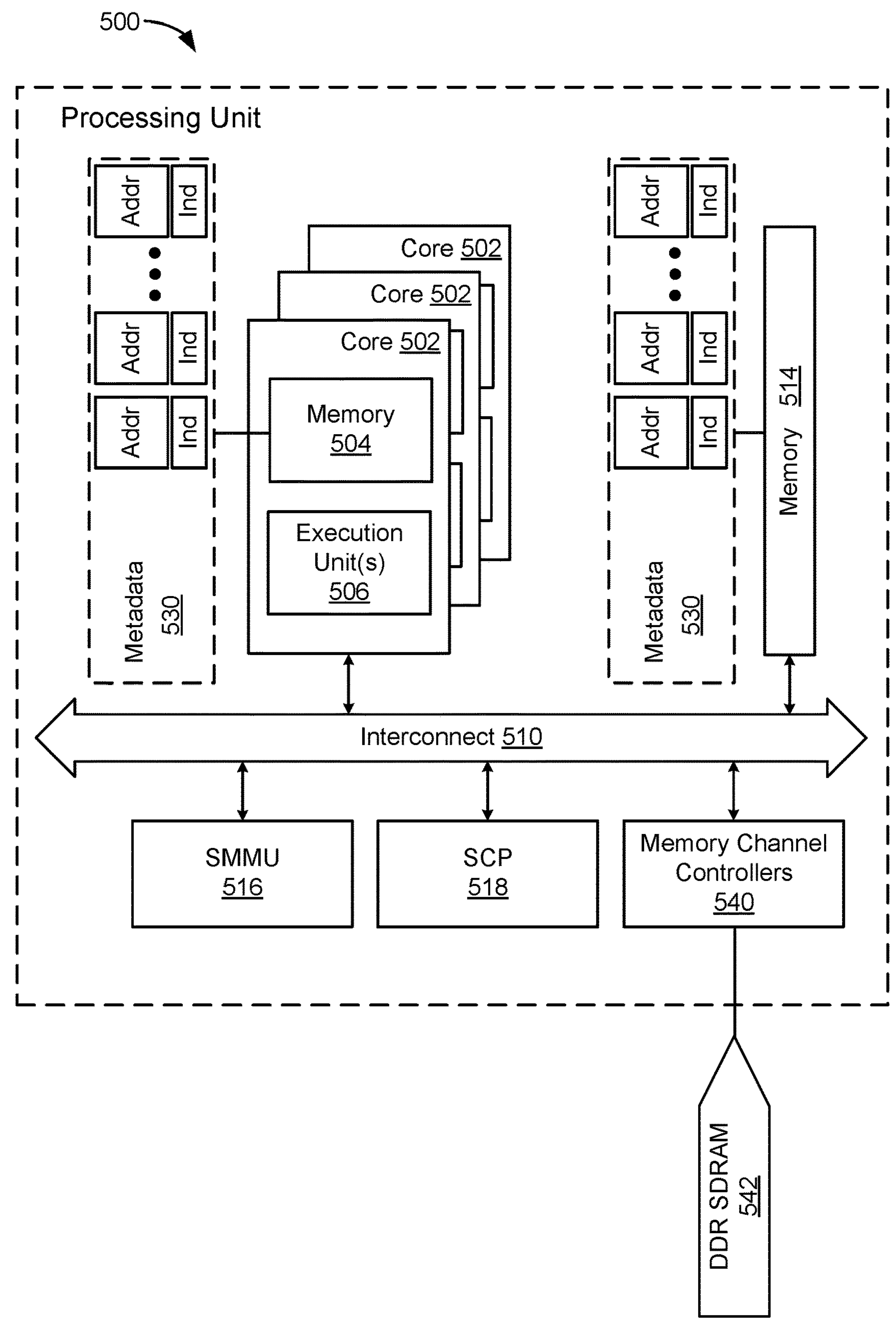
FIG. 5 illustrates an example of a processing unit with metadata components for memory structures, according to aspects of the disclosure.

FIG. 5 illustrates an example of a processing unit 500 with metadata components 530 for memory structures, according to aspects of the disclosure. In some examples, the techniques for optimizing store of common values to memory structures described herein may be implemented using the processing unit 500 with the metadata components 530 for memory structures. Various aspects associated with processing unit 100 and processing unit 400 may be included in processing unit 500. Similar to processing unit 100 and processing unit 400, processing unit 500 may be configured as a CPU, a GPU, a TPU, or other processing units. Additionally, various aspects associated with instruction execution unit 220 and instruction execution unit 420 may be included in processing unit 500.

Processing unit 500 may include one or more cores 502. Each core 502 may include cache memory 504 and one or more execution units 506. Each core 502 may be coupled to interconnect 510. In some examples, cache memory 504 may be configured as data cache memory and instruction cache memory on the core 502 (e.g., 64 KB L1 Instruction-cache, 64 KB L1 Data-cache, and 1 MB L2 cache, in one aspect). Processing unit 500 may also include system-level (or last-level) cache memory 514, which may also be coupled to interconnect 510. In some examples, system-level cache memory 514 may include system-level cache (e.g., 32 MB in one aspect) that may be used for various purposes by the processing unit 500. Processing unit 500 may include an SMMU 516 operatively coupled to interconnect 510. Processing unit 500 may also include an SCP 518. The SCP 518 may be configured to handle various system management functions. In some examples, the processing unit 500 may include memory controllers and memory devices, such as memory channel controllers 540 and DDR5 SDRAM 542 (e.g., 8 TB total memory in some aspects).

In some examples, one or more metadata components 530 may be configured to indicate whether a memory address includes an all-zeros value (or other common value). The metadata components 530 may be coupled to the cache memory 504 of the cores 502 and/or the system-level cache memory 514. In some examples, metadata component 530 may include a memory address and a corresponding one or more indicator bits indicating whether an all-zeroes value (or other common value) is stored in the memory address.

In some cases, each time an all-zeros is stored to a memory address, the metadata component 530 may be updated with the memory address and an indication that the memory address includes the all-zeros value. In some cases, all recent memory addresses are included in the metadata component 530, and each time a value is stored to the memory address, the metadata component 530 may be updated with an indication whether the memory address includes an all-zeros value (or a common value) or a value different from the all-zeros value (or the common value).

In some examples, after a store-zeros micro-operation has been scheduled for execution, and an all-zeros value has been stored in a memory structure, the metadata component 530 may be set to indicate that the memory address of the memory structure includes the all-zeros value. For example, the store-zeros micro-operation may store the all-zeros value in a store queue of a cache memory (e.g., the cache memory 504 and/or the system-level cache memory 514). The knowledge of the all-zeros value being in the cache memory may also be known to a scheduler (e.g., scheduler 226 or scheduler 426) and tracked by the scheduler. In some cases, the scheduler may know that the all-zeros value is stored in the cache memory 504 and/or the system-level cache memory 514 based on the portion of the mnemonic (e.g., "stpz") for mnemonic associated with the store-zeros micro-operation scheduled and subsequently executed. Accordingly, the scheduler or other components of processing unit 500 may set the metadata component 530 to indicate that the all-zeros value is stored in the cache memory 504 and/or the system-level cache memory 514 based on this knowledge of the mnemonic (e.g., "stpz") and execution of the store-zeros micro-operation.

In accordance with some implementations, the metadata component 530 may be set using one or more indicator bits to indicate that the all-zeros value was written into the memory address or cache memory 504 and/or the system-level cache memory 514. For example, a register (e.g., register 230-*d*) may be configured as a store queue register for use as a temporary storage structure. That is, for example, the store queue register may be configured to support intermediate buffering and forwarding of data associated with multiple micro-operations scheduled by the scheduler (e.g., scheduled 226 or scheduler 426). In some cases, these multiple micro-operations may correspond to an instruction or set of instructions that utilize at least some of the same data that was stored in accordance with the store-zeros micro-operation when performing subsequent micro-operations.

In accordance with some aspects, an instruction execution unit (e.g., instruction execution unit 220 or instruction execution unit 420) may configure or be configured with a register (e.g., register 230-*e*) as a control information register for the metadata component 530. In this manner, the metadata component 530 may manage the one or more indicator bits and corresponding memory address associated with the store queue register (e.g., register 230-*d*). In some cases, the one or more indicator bits may occupy a portion of the control information register for the metadata component 530. In some cases, multiple indicator bits may be included in the metadata component 530.

For example, two indicator bits of the one or more indicator bits may be used to identify the all-zeros value and other common values, if any, associated with the store queue (e.g., 00='access store queue for data', 01='access store queue for data', 10='store queue is an all-zeros value', and 11='store queue is an all-ones value' in one aspect). In some cases, where the memory address for the store queue is added only when the store queue is known to include the all-zeros value or other common values, a bit may be used to indicate the all-zeros value or other common values (e.g., 0='an all-zeros value', and 1='an all-ones value' in one aspect). In various implementations, the number of bits in the one or more indicator bits (e.g., one bit, two bits, etc.) is fewer than the number of bits in a data element that is stored in the corresponding memory structure, such as the store queue. (e.g., 32 bits, 64 bits, 128 bits, etc.).

In some cases, the control information register (or other register sources) for the metadata component 530 may also be utilized for indicating that other memory structures include the all-zeros value (or other common values). In some cases, the metadata component 530 may include a memory address for a particular store queue, a temporary storage structure, a memory location, etc.

In some examples, a scheduler (e.g., scheduler 226 or scheduler 426) may schedule and track micro-operations involving 'store to load forwarding' functionality that involves a store queue, such as a store queue register (e.g., register 230-*d*). That is, for example, the scheduler may determine that a value stored in the store queue register may need to be used as a data element for a subsequent micro-operation. For example, a load register (LDR) instruction or like instruction may require that the data associated with the store queue register be loaded or moved into another register. As such, when the scheduler sends a load micro-operation to a load-store unit (e.g., load-store unit 228) for execution, the scheduler and/or the load-store unit may check the metadata component 530 to determine if an indicator bit associated with the store queue register setting is set to indicate that the data element of the store queue register is an all-zeros value.

Upon determining that the indicator bit in the metadata component 530 is set to indicate the all-zeros value in the store queue register (e.g., register 230-*d*), a scheduler (e.g., scheduled 226 or scheduler 426) and/or a load-store unit (e.g., load-store unit 228) may refrain from accessing the store queue register. Rather, the scheduler and/or the load-store unit may apply the all-zeros value to another register for subsequent micro-operations corresponding to the 'store to load forwarding' functionality.

An instruction execution unit (e.g., instruction execution unit 220 or instruction execution unit 420) of the processing unit 500 may then perform additional micro-operations (e.g., one or micro-operations associated with a memory instruction, an integer instruction, an SIMD instruction, a floating point instruction, etc.) that include various operators (e.g., relational operators, Boolean operators, bitstring operators, arithmetic operators, etc.) on the all-zeros value without accessing the store queue register (e.g., register 230-*d*). In some cases, one or more of the additional micro-operations performed with respect to the other register may be performed by the one or more execution units 506.

Additionally, or alternatively, the metadata component 530 may be implemented by a memory management unit associated with the system-level cache memory 514 and/or the memory channel controllers 540 controlling the DDR5 SDRAM 542. That is, for example, the metadata component 530 may be implemented by the memory management unit with respect to one or more cache lines in a memory structure.

In some examples, a set of indicator bits of the metadata component 530 may be set with respect to one or more cache lines in the system-level cache memory 514 in accordance with some implementations. In some cases, each indicator bit in the set of bits of the metadata component 530 may reference a subset of the one or more cache lines in the system-level cache memory 514. In some cases, the one or more cache lines may correspond to data elements in the DDR5 SDRAM 542.

For example, rather than reading to load or writing to store a first subset of the one or more cache lines (e.g., a first 8 bytes of a 64 byte cache line on one aspect) contemporaneously when a value of the first subset is known to be a an all-zeros value, a first bit of the set of indicator bits of the metadata component 530 corresponding to the first subset of the one or more cache lines may be set to indicate that the value of the first subset is the all-zeros value.

If the value of a second subset of the one or more cache lines is the all-zeros value, a second bit of the set of indicator bits of the metadata component 530 corresponding to the second subset of the one or more cache lines may be set to indicate that the value of the first subset is the all-zeros value. In this manner, the read/load and write/store processes for the physical data bytes in the system-level cache memory 514 and/or the DDR5 SDRAM 542 may be avoided, delayed, and/or reduced, in accordance with some examples.

It is to be appreciated that the microarchitecture of the processing unit 500 may realize a power savings by delaying and/or suppressing certain read/load and write/store functions associated with cache lines in memory structures. Additionally, the all-zeros value metadata optimizations may also save energy on subsequent memory reads of the cache lines associated with memory locations and structures. That is, for example, fewer bits of metadata in metadata component 530 are read instead of an entire cache line of the memory location and structure, in accordance with some aspects.

Figure 6:
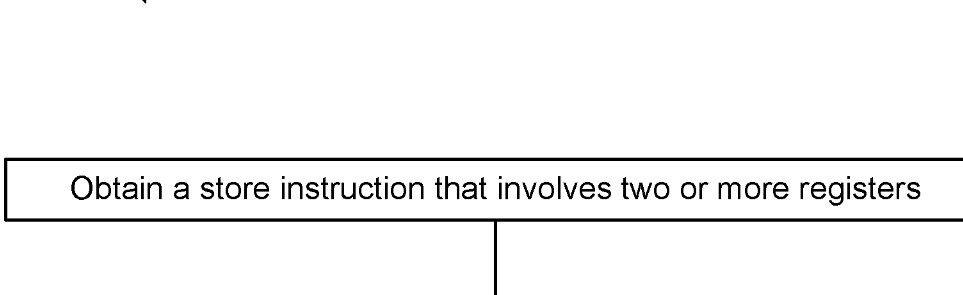
FIG. 6 is a flowchart of an example process for decoding instructions in a processing unit, according to aspects of the disclosure.

FIG. 6 is a flowchart of an example process 600 associated with techniques for optimizing store of common values to memory structures, according to aspects of the disclosure. In some implementations, one or more process blocks of FIG. 6 may be performed by a processing unit (e.g., processing unit 100 including instruction execution unit 220, processing unit 400 including instruction execution unit 420, processing unit 500, etc.). In some implementations, one or more process blocks of FIG. 6 may be performed by another component of the processing unit different from an instruction execution unit of a core. Additionally, or alternatively, one or more process blocks of FIG. 6 may be performed by one or more components of a processing unit, such as processors (e.g., cores 102), cache and memory (e.g., memory 104, 114), execution units (e.g., execution units 106, 206), interconnects (e.g., interconnect 110), and/or memory management units associated therewith.

As shown in FIG. 6, process 600 may include, at block 602, obtaining a store instruction that involves two or more registers. Means for performing the operation of block 602 may include any of the processing unit described herein. That is, for example, a decoder (e.g., decoder 224, instruction decoder 424-*a* and register rename unit 424-*b*, etc.) may obtain the store instruction that involves two or more registers from an instruction fetch unit (e.g., instruction fetch unit 222, instruction fetch unit 422, etc.).

As further shown in FIG. 6, process 600 may include, at block 604, determining that at least one register of the two or more registers comprises an all-zeros value. Means for performing the operation of block 604 may include any of the processing unit described herein. That is, for example, a decoder (e.g., decoder 224, instruction decoder 424-*a* and register rename unit 424-*b*, etc.) may determine that at least one of the two or more registers (e.g., registers 230) comprises an all-zeros value.

As further shown in FIG. 6, process 600 may include, at block 606, decoding the store instruction to include a store-zeros micro-operation based at least in part on the determining. Means for performing the operation of block 606 may include any of the processing unit described herein. That is, for example, a decoder (e.g., decoder 224, instruction decoder 424-*a* and register rename unit 424-*b*, etc.) may decode the instruction into a store-zeros micro-operation (e.g., code line 306) based at least in part on the determining (e.g., code line 304).

Process 600 may include additional implementations, such as any single implementation or any combination of implementations described below and/or in connection with one or more other processes described elsewhere herein.

In some aspects, a first number of registers used by the store-zeros micro-operation is fewer than a second number of the two or more registers of the store instruction.

In some aspects, the first number is two and the second number is three.

In some aspects, process 600 includes a first register of the two or more registers is encoded in a first instruction field of the store instruction and comprises a first value to be stored in a cache memory, a second register of the two or more registers is encoded in a second instruction field of the store instruction and comprises a second value to be stored in the cache memory, and a third register of the two or more registers is encoded in a third instruction field of the store instruction and comprises a base register value.

In some aspects, the store-zeros micro-operation uses the third register as a first source register and the first register as a second source register for executing the store-zeros micro-operation.

In some aspects, process 600 includes the store instruction comprises a store pair of registers (STP) instruction, and the store-zeros micro-operation is a single memory-based micro-operation decoded for the STP instruction.

In some aspects, process 600 includes scheduling the store-zeros micro-operation for execution, calculating a memory address based at least in part on the base register value, and storing, based at least in part on executing the store-zeros micro-operation, an all-zeros value in the cache memory corresponding to the calculated memory address.

In some aspects, process 600 includes scheduling the store-zeros micro-operation for execution, storing, based at least in part on executing the store-zeros micro-operation, an all-zeros value in a store queue register of a cache memory, and setting zeros-indicating metadata to indicate that the store queue register includes the all-zeros value.

In some aspects, process 600 includes refraining from accessing the store queue register for a micro-operation executed subsequent to the store-zeros micro-operation based at least in part on the zeros-indicating metadata.

In some aspects, process 600 includes the zeros-indicating metadata comprises one or more indicator bits, and a number of the one or more indicator bits is fewer than a number of bits in a cache line of a data element corresponding to the store queue register.

In some aspects, the determining that the at least one register of the two or more registers comprises the all-zeros value is based at least in part on a mnemonic associated with the store instruction.

In some aspects, the mnemonic comprises a zero register (XZR) mnemonic.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Advantages of process 600 include, in some examples, reduced power consumption and/or increased throughput by reducing a number of micro-operations that are to be performed by the processing unit. That is, for example, the energy cost of certain instructions may be reduced thereby increasing performance throughput. Additionally, or alternatively, by suppressing certain writes and stores from registers into memory, the microarchitecture of the processing unit realizes a power savings by not performing these suppressed store functions.

Those of skill in the art will appreciate that information and signals may be represented using any of a variety of different technologies and techniques. Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects described herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium, including but not limited to, computer readable medium or non-transitory storage media known in the art. An example storage medium may be coupled to the processor such that the processor can read information from, and write information to, the storage medium. In the alternative, the storage medium may be integral to the processor. The processor and the storage medium may reside in an ASIC.

Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method for instruction decoding, comprising:

obtaining a store instruction that involves two or more registers;

determining that at least one register of the two or more registers comprises an all-zeros value; and decoding the store instruction to include a store-zeros micro-operation based at least in part on the determining.

2. The method of claim 1, wherein a first number of registers used by the store-zeros micro-operation is fewer than a second number of the two or more registers of the store instruction.

3. The method of claim 2, wherein the first number is two and the second number is three.

4. The method of claim 1, wherein:

a first register of the two or more registers is encoded in a first instruction field of the store instruction and comprises a first value to be stored in a cache memory, a second register of the two or more registers is encoded in a second instruction field of the store instruction and comprises a second value to be stored in the cache memory, and a third register of the two or more registers is encoded in a third instruction field of the store instruction and comprises a base register value.

5. The method of claim 4, wherein the store-zeros micro-operation uses the third register as a first source register and the first register as a second source register for executing the store-zeros micro-operation.

6. The method of claim 5, wherein:

the store instruction comprises a store pair of registers (STP) instruction, and the store-zeros micro-operation is a single memory-based micro-operation decoded for the STP instruction.

7. The method of claim 4, further comprising:

scheduling the store-zeros micro-operation for execution;

calculating a memory address based at least in part on the base register value; and storing, based at least in part on executing the store-zeros micro-operation, an all-zeros value in the cache memory corresponding to the calculated memory address.

8. The method of claim 1, further comprising:

scheduling the store-zeros micro-operation for execution;

storing, based at least in part on executing the store-zeros micro-operation, an all-zeros value in a store queue register of a cache memory; and setting zeros-indicating metadata to indicate that the store queue register includes the all-zeros value.

9. The method of claim 8, further comprising:

refraining from accessing the store queue register for a micro-operation executed subsequent to the store-zeros micro-operation based at least in part on the zeros-indicating metadata.

10. The method of claim 8, wherein, the zeros-indicating metadata comprises one or more indicator bits, and a number of the one or more indicator bits is fewer than a number of bits in a cache line of a data element corresponding to the store queue register.

11. The method of claim 1, wherein the determining that the at least one register of the two or more registers comprises the all-zeros value is based at least in part on detecting, in the store instruction, a mnemonic associated with the at least one register.

12. The method of claim 11, wherein the mnemonic comprises a zero register (XZR) mnemonic.

13. A processing unit, comprising:

a plurality of registers; and one or more processors communicatively coupled to the plurality of registers and to communicate with one or more memories, the one or more processors, either alone or in combination, configured to:

obtain a store instruction that involves two or more registers;

determine that at least one register of the two or more registers comprises an all-zeros value; and decode the store instruction to include a store-zeros micro-operation based at least in part on a determination that the at least one register of the two or more registers comprises the all-zeros value.

14. The processing unit of claim 13, wherein:

a first register of the two or more registers is encoded in a first instruction field of the store instruction and comprises a first value to be stored in a cache memory, a second register of the two or more registers is encoded in a second instruction field of the store instruction and comprises a second value to be stored in the cache memory, and a third register of the two or more registers is encoded in a third instruction field of the store instruction and comprises a base register value.

15. The processing unit of claim 13, wherein the one or more processors, either alone or in combination, are further configured to:

schedule the store-zeros micro-operation for execution;

store, based at least in part on executing the store-zeros micro-operation, an all-zeros value in a store queue register of a cache memory; and set zeros-indicating metadata to indicate that the store queue register includes the all-zeros value.

16. The processing unit of claim 15, wherein the one or more processors, either alone or in combination, are further configured to:

refrain from accessing the store queue register for a micro-operation executed subsequent to the store-zeros micro-operation based at least in part on the zeros-indicating metadata.

17. The processing unit of claim 15, wherein:

the zeros-indicating metadata comprises one or more indicator bits, and a number of the one or more indicator bits is fewer than a number of bits in a cache line of a data element corresponding to the store queue register.

18. The processing unit of claim 13, wherein the one or more processors, either alone or in combination, configured to determine that the at least one register of the two or more registers comprises the all-zeros value, are further configured to determine that the at least one register of the two or more registers comprises the all-zeros value based at least in part on detecting, in the store instruction, a mnemonic associated with the at least one register.

19. A non-transitory computer-readable medium storing computer-executable instructions that, when executed by a processing unit, cause the processing unit to:

obtain a store instruction that involves two or more registers;

determine that at least one register of the two or more registers comprises an all-zeros value; and decode the store instruction to include a store-zeros micro-operation based at least in part on a determination that the at least one register of the two or more registers comprises the all-zeros value.

20. The method of claim 1, wherein the store-zeros micro-operation stores an all-zeros value to memory without reading at least one register of the two or more registers from which the store instruction would otherwise obtain data to be stored.

* * * * *